United States Patent
Greenwald

[15] 3,687,233
[45] Aug. 29, 1972

[54] INTEGRAL LUBRICATION SYSTEM
[72] Inventor: Harold A. Greenwald, Los Angeles, Calif.
[73] Assignee: The Garrett Corporation, Los Angeles, Calif.
[22] Filed: July 23, 1970
[21] Appl. No.: 57,651

[52] U.S. Cl............184/6.18, 123/196 W, 308/134.1
[51] Int. Cl...............................F16c 1/24, F16n 7/36
[58] Field of Search.........184/6.18, 6.11; 308/134.1, 308/169; 123/196 W

[56] References Cited

UNITED STATES PATENTS 3,074,688  1/1963  DeMuth et al........184/6.11 X

FOREIGN PATENTS OR APPLICATIONS 814,321  6/1959  Great Britain..........308/134.1
1,002,714  8/1965  Great Britain............184/6.18
202,808  6/1956  Australia..................184/6.18

Primary Examiner—Manuel A. Antonakas
Attorney—Albert J. Miller and John N. Hazelwood

[57] ABSTRACT

A self-contained lubrication system for a rotary machine includes a sump along with means for filtering and cooling. A shaft of the machine has a hollow and disposed near the sump so that rotation of the shaft, which includes a centrifugal slinger, forms a vortex of lubricant therein so as to deliver lubricant to the shaft bearings through the hollow shaft.

15 Claims, 5 Drawing Figures

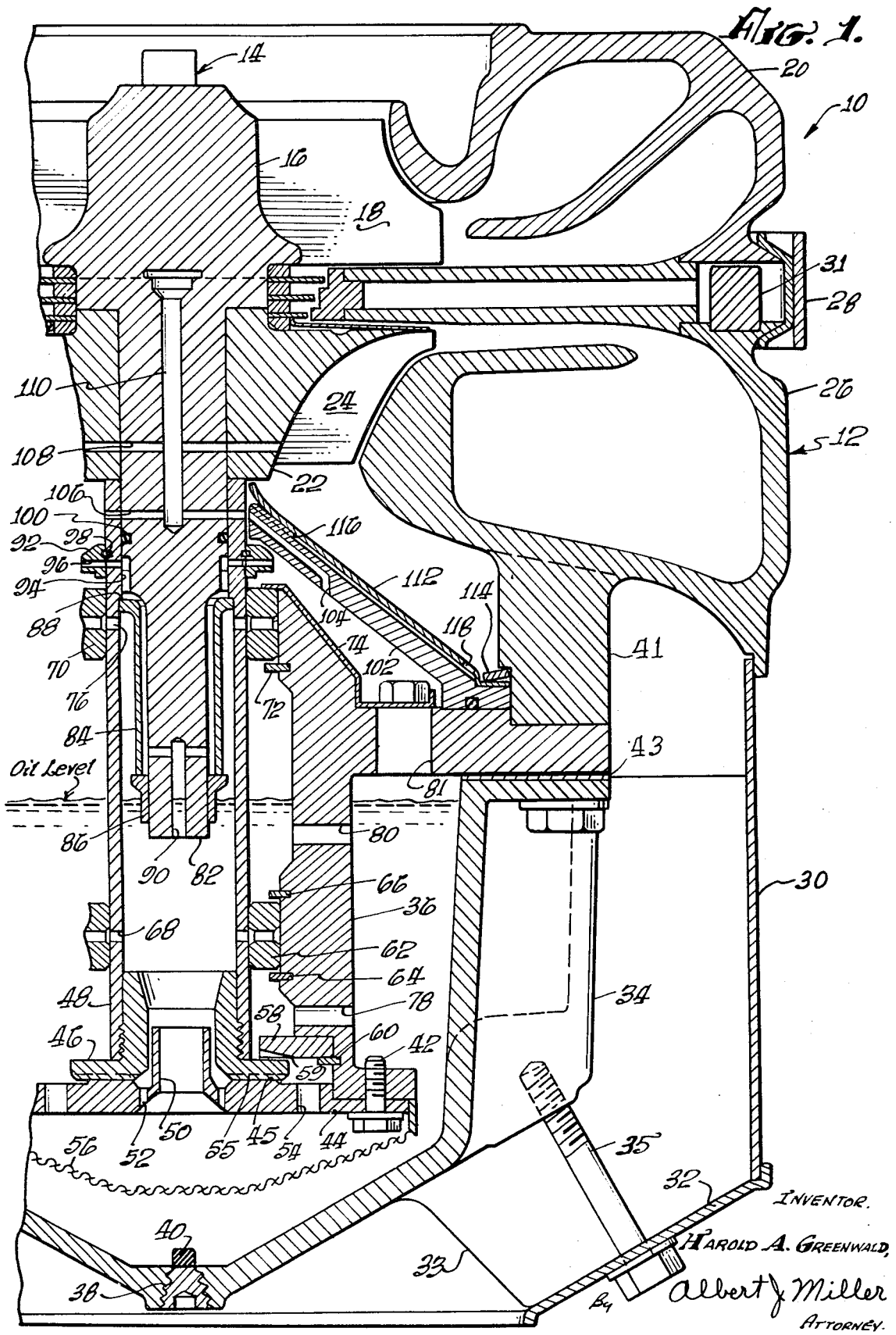

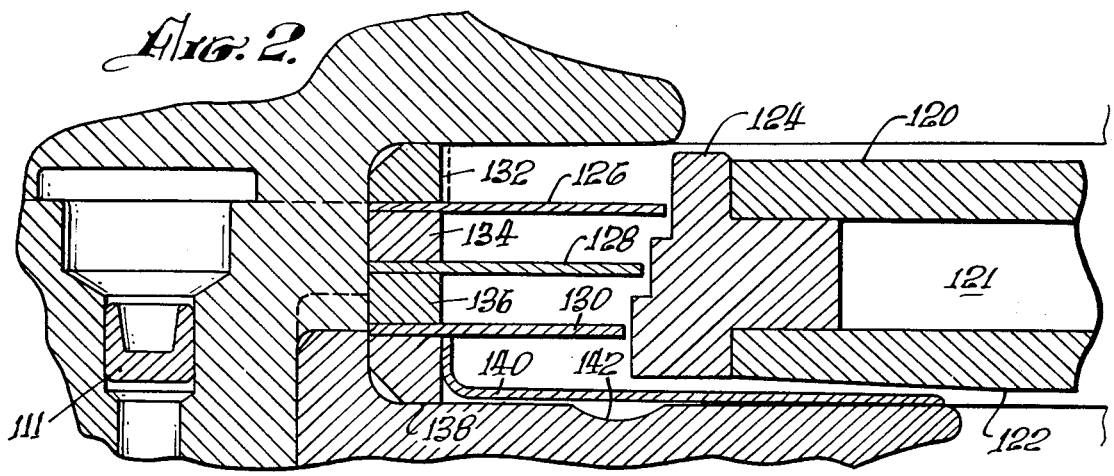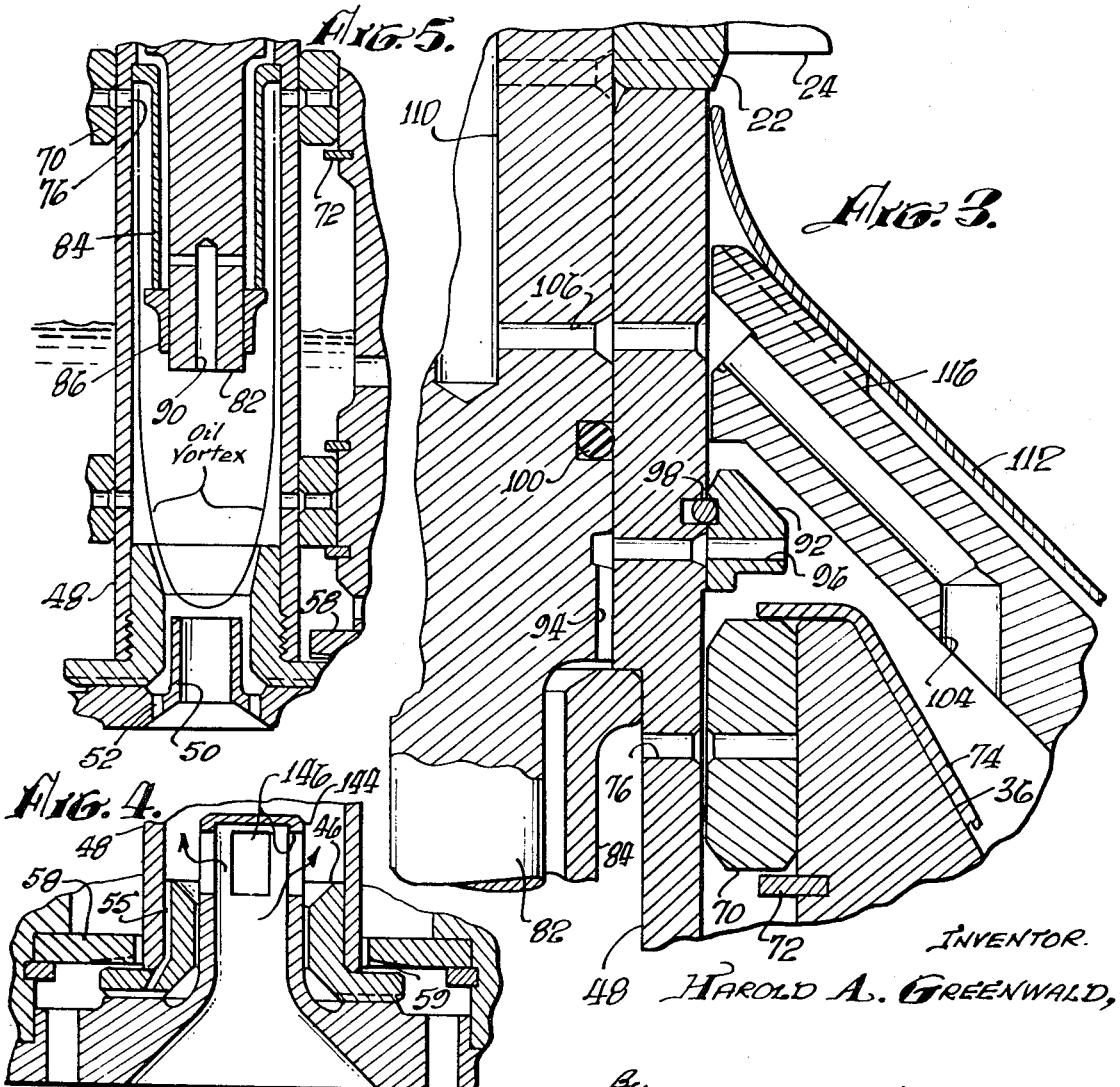

003,687,233

INTEGRAL LUBRICATION SYSTEM

BACKGROUND OF THE INVENTION

The lubrication of bearings in a high speed rotary machine such as a turbocharger consisting of a compressor unit driven by an engine exhaust gas turbine to supply compressed air to an internal combustion engine has long presented many problems. The high speeds at which the turbocharger shaft rotates and the use of the internal combustion engine oil or oil from another source external to the turbocharger to lubricate the bearings have served to compound these problems. The engine oil is usually contaminated with foreign particles, weak acids and/or water and is not of optimum viscosity for lubrication of high speed bearings which must operate under a wide range of environmental temperature conditions. In addition, plumbing connections between the engine oil system and the turbocharger also introduce difficulties of assembly, possible leakage, and additional cost for materials and labor.

SUMMARY OF THE INVENTION

The invention comprises an integral, self-contained, lubrication system for a rotary machine such as a turbocharger. The system includes an integral sump and does not require an external oil system which must not only lubricate but also provide filtering and cooling.

BRIEF DESCRIPTION OF THE DRAWINGS

FIG. 1 is a partial sectional view of a turbocharger embodying a typical lubrication system of the present invention.

FIG. 2 is an enlarged view of the baffle seal area of the turbocharger of FIG. 1.

FIG. 3 is an enlarged view of the shaft seal area of the turbocharger of FIG. 1.

FIG. 4 is an enlarged view of an alternate shaft oil inlet for the turbocharger of FIG. 1.

FIG. 5 is a partial view of the lubrication system of FIG. 1 during shaft rotation showing a typical oil vortex inside the shaft.

DESCRIPTION OF THE PREFERRED EMBODIMENT

As shown in FIG. 1, the turbocharger comprises a turbine 10 and a compressor 12 arranged upon a common shaft assembly 14. The turbine 10 receives pressurized fluid such as exhaust gases from an internal combustion engine thus rotating the shaft 14 which operates the rotor 22 of the compressor 12 to supply compressed air to the internal combustion engine. The turbine comprises a hub 16 on which are mounted turbine blades 18 rotating within a turbine housing 20. The compressor 12 comprises a rotor or hub 22 having impeller blades 24 rotating within compressor housing 26. The turbine housing 20 and compressor housing 26 are held together by a circumferential clamp 28 and maintained in their relative concentric position by multiple keys 31 which fit into appropriate corresponding slots. The baffle seal between the turbine and compressor will be explained in more detail with respect to FIG. 2.

Extending downward from the compressor housing 26 is a cylindrical shroud 30 having an end shroud 32 positioned around a lubricant (such as oil) sump housing 34. The end shroud 32 is affixed to the oil sump housing 34 by several screws 35. Fins 33 may be provided between the sump housing 34 and the shrouds 30 and 32. A stationary bearing carrier 36 extends down within the oil sump housing 34 from several compressor housing struts 41 which serve to align the bearing carrier 36. A gasket 43 may be provided between the bearing carrier 36 and sump housing 34. Drain plug 38 including chip collector magnet 40 are provided at the bottom of the oil sump housing 34.

Attached to the bottom of the stationary bearing carrier 36 by several screws 42 is an orifice plate 44. The orifice plate 44 includes a raised portion which comprises a thrust bearing 45 to support a thrust bearing collar 46 which is threaded to a hollow cylindrical sleeve 48 that extends downward from and rotates as part of drive shaft assembly 14. An oil inlet orifice 50 extends upward from the orifice plate 44 into the thrust bearing collar 46. A secondary oil inlet 52 extends through the orifice plate into the region between the rotary thrust bearing and the stationary orifice plate 44. Oil drains 54 are provided near the outer periphery of the orifice plate 44. Recesses 55 at the bottom of the thrust bearing collar 46 permit the flow of oil between the rotary and stationary thrust bearing surfaces. The entire underside of the orifice plate 44 may be provided with a porous filter 56.

A thrust washer 58 including oil grooves 59, mounted in the stationary bearing carrier 36 by snap ring 60 is provided as a stationary thrust surface to take an upward thrust (opposite from normal) from the upper side of the rotary thrust collar. A lower bearing 62 located axially by snap rings 64 and 66 in the stationary bearing carrier 36 is positioned near the lower end of the sleeve 48 below the oil level in the sump housing 34. Openings 68 in the sleeve 48 provide lubricating oil to the bearing 62 from the interior of the shaft sleeve 48. An upper bearing 70 located axially by snap ring 72 and bearing retainer 74 at the upper end of the bearing carrier 36, is positioned near the upper end of the sleeve 48. Openings 76 in the sleeve 48 provide access for the lubricating oil to bearing 70. Drains 78, 80, and 81 in bearing carrier 36 are provided for the flow of bearing end leakage oil to the oil sump from the space between the bearing carrier 36 and sleeve 48 during operation of the machine.

A turbine shaft extension 82 extends downward from the turbine shaft (hub) 14 into the sleeve 48 and is held in tension by a spacer tube 84. The spacer tube 84, which is in compression, extends between a nut 86 threaded to the bottom of the shaft extension 82 and an internal shoulder 88 in the sleeve 48. A passage 90 and associated annulus and slots form a path for gases or vapors to a space above the normal oil level in the sump.

An oil slinger 92 is mounted around the sleeve 48 above the upper bearing 70. Slots 94 in the turbine shaft extension 82 communicate with openings 96 in the oil slinger 92 and sleeve 48. A snap ring 98 may be provided between the oil slinger 92 and the sleeve 48 to maintain the slinger 92 in its proper axial position. Likewise, an "O" ring 100 may be provided between the turbine shaft extension and the inside diameter of the sleeve 48 to prevent axial leakage.

An oil sump cap 102 mounted upon the upper surface of the bearing carrier 36 extends around the upper end of the sleeve 48. A passage 104 in the upper end of the oil sump cap 102 communicates with radial holes 106 in the turbine shaft 14 and sleeve 48. There are radial holes 108 which together with holes 106 communicate with axial hole 110, which is closed at its upper end by plug 111 shown in FIG. 2. An oil sump cap shroud 112 extends over the oil sump cap 102 and may be held between the base of the cap 102 and the compressor housing 26 by means of a Belleville type washer 114. Multiple bosses or lugs 116 at the upper end of the cap 102 maintain an open space between the oil sump cap 102 and the oil sump cap shroud 112. Multiple openings 118 near the base of the oil sump cap shroud provide access for air flow to this space.

As shown in FIG. 2, the baffle seal for the turbocharger comprises baffles 120 and 122 which support a stationary stepped labyrinth ring 124. A series of rotating discs 126, 128 and 130 positioned by spacers 132, 134, 136 and 138 extend from the turbine and compressor rotor hub extensions to the steps (with suitable small clearances) of the stationary labyrinth ring 124. Radiation shield or deflector 140 is located between the compressor hub 22 and the spacer 130. An air space 142 may be provided between the compressor hub 22 and the deflector 140. The space between the baffles 120 and 122 may include insulation 121.

The alternate oil inlet arrangement of FIG. 4 is essentially that shown in FIG. 1 except that the oil inlet includes an oil guide 144 which extends upward through the stationary orifice plate 44 into the interior of the shaft sleeve 48. Thus, while the thrust collar 46 and sleeve 48 rotate, the oil guide 144, which includes openings or slots 146, remains stationary as part of the orifice plate 44.

The lubrication system is illustrated in FIG. 1 with the oil level at zero shaft speed. With the oil level in the sump 34 above the lower bearing 62, lubrication of this bearing during rotation of the shaft 14 does not present as many difficulties during starting and operation as the upper bearing 70, since the upper bearing 70 is above this zero speed oil level. Rotation of the shaft 14 including sleeve 48 will, however, create a vortex of rotating oil within sleeve 48. The oil is centrifuged to the inside diameter of sleeve 48 and is forced to climb to the oil holes 76. Oil is also delivered through holes 68 to the lower bearing 62. A high oil pressure is developed at the inside diameter of the sleeve 48 during shaft rotation.

When the shaft speed is zero, the oil level inside the sleeve 48 will be the same as the oil level in the sump 34. When the shaft 14 starts to rotate a vortex of oil will be formed in the sleeve 48 since the oil will tend to rotate with the sleeve 48. As the speed of the shaft 14 increases, the height of the vortex will rise. FIG. 5, which shows the shaft during rotation, illustrates this oil vortex. The vortex will become longer in the axial direction, but at very high speed where the oil supply through orifice 50 begins to limit the flow, the thickness of the oil annulus inside 48 will tend to decrease. The actual height of the vortex of rotating oil or the thickness of the oil annulus will depend on such factors as speed, inside diameter of the sleeve 48, relative size of the orifice, size and number of oil holes in the shaft, oil viscosity, the head or pressure difference across the orifice 50, and other related factors. The flat upper surface of the orifice 50 will help to prevent the high pressure oil in the vortex from leaking back into the sump.

In this manner the oil is essentially pumped by centrifugal force up into both the lower bearing 62 and the upper bearing 70. The oil flows into the interior of the sleeve 48 through the inlet orifice 50. Part of the oil also flows through the openings 52, through the recesses 55 in the thrust bearing collar 46 and back down drain 54 in the orifice plate 44. The permanent magnet chip collector 40 and porous filter 56 will serve to maintain the oil going through the bearings in a non-contaminated condition. The end leakage of oil from the lower end of bearing 62 will return to the sump through the drain 78. End leakage from the upper end of bearing 62 and the lower end of the upper bearing 70 may return to the sump through drain 80. End leakage from the upper end of bearing 70 will return to the sump through drain 81.

The lubricant may be a high grade low vapor pressure synthetic oil having temperature and oxidation resistance at temperatures up to 400° F or higher. The amount of oil required in the sump would, of course, depend upon the size of the lubricating system but would normally be quite nominal, for example, on the order of one-sixth of a gallon. Since the oil will not be subjected to the usual contaminants in engine oil (which is used in conventional turbochargers) such as foreign particles, non-burnt fuel, water dilution, acids and the like, it is capable of lasting for thousands of hours of operation. Synthetic oils generally have a flatter viscosity characteristic when compared to petroleum oil and thus have a lower viscosity at very low temperatures and a higher viscosity at high temperatures for comparable grades. It has been found by tests that oil can begin to be supplied to the upper bearing of a vertical shaft unit suitable for supercharging a 200 to 300 h.p. Diesel engine at between 2,500 and 3,000 r.p.m. turbocharger speed. This insures oil to the bearings under some conditions faster than with an engine oil system where there is an appreciable delay after the engine starts. At this low speed, the loads on the bearings of a balanced turbocharger are negligible. The speed of a turbocharger during engine idle may be in the vicinity of 12,000 to 16,000 r.p.m. Maximum speed may exceed 100,000 r.p.m.

Cooling of the oil may be obtained by fins 33 extending between the outside of the oil sump housing 34 and the shroud 30 and end shroud 32. The air on its way to the compressor inlet can provide this cooling as it passes over the fins 33.

The high operating speeds of the turbocharger rotating the sleeve 48 and thrust bearing collar 46 or any equivalent shaft configuration, will tend to create a prerotational effect upon the oil entering the shaft unless a stationary inlet within the shaft, such as orifice 50, is provided. Excessive prerotation would impede the oil flow to the inside of the shaft. It has been found that this effect can be further prevented by providing a stationary oil guide 144 including orifices 146 which extend into the interior of the sleeve 48 beyond the hub of the thrust bearing collar 46. The clearance provided between the outside diameter of the oil guide 144 and the inside diameter of the hub of the thrust bearing collar 46 is kept small on the order of 0.005 to 0.010 radial clearance. Since it is a smaller diameter than the inside diameter of the sleeve 48, oil leakage out of the shaft at this point is negligible. The oil pressure at the smaller diameter is small relative to that at the bearing oil holes at the inside diameter of sleeve 48.

The spacer 84, held between the nut at the end of the turbine shaft extension 82 and the recess 88 in the sleeve 48, maintains the turbine shaft extension 82 in tension while the spacer itself is in compression to maintain tightness under varying temperature conditions. The vent 90 at the base of the turbine shaft extension 82 and the passages provided to the slinger 92 permit the slinger rotation to act as a centrifugal gas pump to lower the pressure within the shaft sleeve 48. This increases the effective pressure difference across the inlet orifice 50 and results in increased oil flow to the inside of the sleeve 48. Thus, the head of oil, due to the oil level in the sump, is effectively multiplied several times and considerably more oil is delivered to the inside of the sleeve for use by the bearings than would be the case otherwise. This was found to be very effective at high speed in the range between 25,00 r.p.m. up to and over 110,000 r.p.m.

Any oil which proceeds axially up past the upper bearing 70 would be thrust outward by the outer surface of the slinger 92 and proceed back into the sump through drain 81. In the unlikely event that any oil proceeds up past the oil slinger, it must still get past the oil sump cap and oil sump cap shroud both of which fit relatively closely around the shaft sleeve 48. Any oil which might proceed upward past the lower edge of the oil sump cap would be thrown by shaft rotation into the annulus and passage 104 in the cap 102. In addition, pressure in the annular air space at the lower end of the oil sump cap shroud 112 near openings 118 is greater than the pressure at the compressor wheel hub and inlet to the compressor blades 24. This higher pressure is communicated to the space between the top of the oil sump cap shroud 112 and sleeve 48 through the space provided between the oil sump shroud 112 and the oil sump cap 102 by means of openings 118. As can be seen, it is extremely unlikely, in view of the many sealing obstacles, that any oil could proceed past the oil sump cap. The sealing arrangement has no rubbing surfaces or small separate parts and there is never more than a small pressure difference between the oil on one side and the air pressure on the other side.

The oil sump is vented to nearly atmospheric pressure through the openings 106, 108, and 110 in the shaft 14. Any oil or oil droplets tending to move away from the sump would be rejected by centrifugal force and kept inside the sump oil cap, since oil is approximately 700 times the density of air. Such oil droplets would drain back to the sump through passages 104. The air pressure above the oil in the sump normally would be slightly below the compressor inlet pressure since passages 108 extend to a larger radius than passages 106, thus producing a gas pumping effect. Variations of several inches of mercury at the compressor inlet may occur. The sump pressure (above the oil) will always be slightly lower than the pressure at the compressor inlet. The seal is essentially an air buffered type with no compressed air supplied from the compressor.

The laybrinth seal between the turbine 10 and compressor 12 effectively minimizes hot exhaust gases from the turbine from entering the compressor when during a transient condition this might otherwise occur. The stepped labyrinth seal provides a multiple blockage to this leakage, while the shield or deflector 140 would direct any leakage, should it occur, away from the compressor hub and impeller. This is desirable since the compressor wheel would normally be made of aluminum and would not tolerate any impingement of hot gas.

The principal advantages of this lubrication system is that it requires no auxiliary services such as lubricating oil, oil filtration and/or oil cooling from the associated engine on which it is installed. This greatly simplifies installation by limiting oil supply and return plumbing lines and connections and possible resultant oil leaks due to imperfect connections, etc. It is independent of the engine's oil cooler which is usually cooled by the engine's water system or an auxiliary oil cooler, and, accordingly, does not add to the oil cooler, water pump, or radiator load. It does not use any other components of the engine oil system such as the engine oil filter, oil pressure relief valve, pressure control valve, etc.

This integral lubrication system could be installed in either a vertical or horizontal attitude although the vertical attitude would be preferable in most instances. Suitable minor modifications, such as providing an inlet tube extending from below the oil level to orifice 50 would, however, be required for horizontal operation since the oil level would be parallel to the shaft. The system offers greater reliability, particularly since it is not forced to use the usually contaminated engine oil but can use a low viscosity, low vapor pressure synthetic oil more suitable to high speed bearings.

While specific embodiments of the invention have been illustrated and described, it is to be understood that these embodiments are provided by way of example only and that the invention is not to be construed as being limited thereto but only by the proper scope of the following claims.

What I claim is:

1. A lubrication system for high speed rotating machinery comprising:
   a lubricant sump;
   a rotating shaft having one hollow end operably associated with said lubricant sump and the other end supporting a rotating assembly;
   bearing means rotatably supporting said hollow end of said rotating shaft, said bearing means including at least one bearing remote from said lubricant sump; and
   means operably associated with said rotating shaft to partially evacuate the interior of the hollow end of said rotating shaft, said means to partially evacuate the interior of the hollow end of said rotating shaft including a certrifugal slinger disposed around the exterior of the hollow end of said rotating shaft remote from said lubricant sump, the hollow end of said rotating shaft having openings therein associated with said slinger to communicate said slinger with the interior of the hollow end of said rotating shaft;
   said hollow end of said rotating shaft having openings therein associated with said bearing means, rotation of the partially evacuated hollow end of said rotating shaft forming a vortex of lubricant therein to deliver lubricant to said bearing means through said openings in said rotating shaft.

2. A lubrication system for high speed rotating machinery comprising:
   a housing including a lubricant sump at the lower end thereof;
   a vertically disposed shaft rotatably mounted within said housing having a lower hollow end extending into the lubricant sump at the lower end of said housing;
   bearing means mounted within said housing to rotatably support said hollow end of said vertically disposed shaft, said bearing means including at least one bearing above the level of the lubricant sump at the lower end of said housing; and
   means operably associated with said vertically disposed shaft to partially evacuate the interior of the hollow end of said shaft during rotation of said shaft, said means to partially evacuate the interior of the hollow end of said shaft during rotation of said shaft including a centrifugal slinger disposed on the exterior of the hollow end of said shaft above the at least one bearing above the level of the lubricant sump, the hollow end of said shaft having openings therein associated with said slinger to communicate said slinger with the interior of the hollow end of said shaft;
   said hollow end of said rotating shaft having openings therein associated with said bearing means, rotation of said shaft forming a vortex of lubricant within the partially evacuated hollow end of said shaft to deliver lubricant to said bearing means through said openings in said hollow end of said shaft.

3. A lubrication system for high speed rotating machinery comprising:
   a housing including a lubricant sump at the lower end thereof;
   a vertically disposed shaft rotatably mounted within said housing having a lower hollow end extending into the lubricant sump at the lower end of said housing;
   a stationary lubricant guide positioned within said lubricant sump below the lower hollow end of said vertically disposed shaft, said guide including an upward projecting orifice extending into the hollow end of said shaft to substantially prevent prerotation of the lubricant in the upward projecting orifice before lubricant entry into the interior of the hollow end of said shaft;
   bearing means mounted within said housing to rotatably support said hollow end of said vertically disposed shaft, said bearing means including at least one bearing above the level of the lubricant sump at the lower end of said housing; and
   means operably associated with said vertically disposed shaft to partially evacuate the interior of the hollow end of said shaft during rotation of said shaft;
   said hollow end of said rotating shaft having openings therein associated with said bearing means, rotation of said shaft forming a vortex of lubricant within the partially evacuated hollow end of said shaft to deliver lubricant to said bearing means through said openings in said hollow end of said shaft.

4. A lubrication system for high speed rotating machinery comprising:
   a housing including a lubricant sump at the lower end thereof;
   a vertically disposed shaft assembly including a lower hollow shaft rotatably mounted within said housing and extending into the lubricant sump and an upper shaft supporting a rotating assembly and including a lower portion extending down into the lower hollow shaft;
   means operably disposed between the lower portion of said upper shaft and the lower hollow shaft to tension the lower portion of said upper shaft;
   bearing means positioned within said housing around said hollow shaft to rotatably support said shaft assembly, said bearing means including at least one bearing above the level of the lubricant sump at the lower end of said housing; and
   means operably associated with said vertically disposed shaft assembly to partially evacuate the interior of the lower hollow shaft;
   said lower hollow shaft having openings therein associated with said bearing means, rotation of said shaft assembly forming a vortex of lubricant within the partially evacuated lower hollow shaft to deliver lubricant to said bearing means through said openings in said lower hollow shaft.

5. The lubrication system of claim 4 wherein said rotation assembly supported on the upper shaft of said vertically disposed shaft assembly includes an inlet extending around the lubricant sump housing so that fluid flowing through said inlet cools said lubricant sump, said inlet having hear transfer surfaces adjacent said lubricant sump.

6. The lubrication system of claim 5 and in addition a stationary lubricant guide positioned within said lubricant sump and extending upward into said lower hollow shaft to prevent prerotation of the lubricant before the lubricant enters the lower hollow shaft.

7. The lubrication system of claim 6 and in addition seal means buffered by the rotating assembly inlet fluid disposed between said rotating assembly and said bearing means.

8. The lubrication system for high speed rotating machinery of claim 4 wherein said means to partially evacuate the interior of the lower hollow shaft comprises centrifugal gas pumping means having an inlet in the lower portion of the upper shaft extending down into the hollow shaft.

9. A lubrication system for high speed rotating machinery comprising:
   a housing having a lubricant sump at the lower end thereof;
   bearing means mounted within said housing including a vertically extending bearing carrier, at least two bearings mounted within said bearing carrier, at least one of said bearings mounted above the lubricant sump level, and a horizontally extending thrust bearing mounted across the bottom of the vertically extending bearing carrier in said lubricant sump;

a vertically disposed shaft assembly including a lower hollow shaft mounted within said bearing carrier and supported by said at least two bearings and said thrust bearing, and an upper shaft supporting a compressor wheel and a turbine wheel, said upper shaft having a shaft extension which extends down into the lower hollow shaft, said horizontally extending thrust bearing having a central opening to the interior of said lower hollow shaft;

compressor housing means positioned around said compressor wheel and including inlet means extending around the lubricant sump housing so that compressor inlet fluid flowing through said inlet means cools said lubricant sump, said inlet means including heat transfer surfaces adjacent said lubricant sump;

turbine housing means positioned around said turbine wheel;

labyrinth seal means including a radiation shield disposed between said compressor wheel and said turbine wheel;

means operably associated with said vertically disposed shaft assembly to partially evacuate the lower hollow shaft; and compressor inlet fluid buffered seal means disposed between said bearing means and said compressor wheel to prevent lubricant from escaping from the lubricant sump;

said lower hollow shaft having openings therein associated with said at least two bearings to permit the delivery of lubricant to said bearings during rotation of said shaft assembly when a lubricant vortex is formed within said lower hollow shaft;

said vertically extending bearing carrier and said horizontally extending thrust bearing having openings for the return of lubricant from said at least two bearings to said lubricant sump.

10. The lubrication system of claim 9 wherein said compressor inlet fluid buffered seal means comprises:

a substantially frusto conical lubricant sump cap extending from the lubricant sump housing at its base to around the shaft assembly and a substantially frusto conical lubricant sump cap shroud positioned around and spaced from said lubricant sump cap to form a passageway therebetween, said lubricant sump cap having openings from the shaft assembly to the interior of the lubricant sump housing, said lubricant sump cap shroud having openings at its base to permit the entry of compressor inlet fluid to the passageway between said lubricant sump cap shroud and said lubricant sump cap.

11. A lubrication system for high speed rotating machinery comprising:

a housing having a lubricant sump at the lower end thereof;

bearing means mounted within said housing including a vertically extending bearing carrier, at least two bearings mounted within said bearing carrier, at least one of said bearings mounted above the lubricant sump level, and a horizontally extending thrust bearing mounted across the bottom of the vertically extending bearing carrier in said lubricant sump;

a vertically disposed shaft assembly including a lower hollow shaft mounted within said bearing carrier and supported by said at least two bearings and said thrust bearing, and an upper shaft supporting a rotary assembly at the upper end of said housing, said upper shaft having a shaft extension which extends down into the lower hollow shaft, said horizontally extending thrust bearing having a central opening to the interior of said lower hollow shaft; and means operably associated with said vertically disposed shaft assembly to partially evacuate the lower hollow shaft;

said lower hollow shaft having openings therein associated with said at least two bearings to permit the delivery of lubricant to said bearings during rotation of said shaft assembly when a lubricant vortex is formed within said lower hollow shaft;

said vertically extending bearing carrier and said horizontally extending thrust bearing having openings for the return of lubricant from said at least two bearings to said lubricant sump.

12. The lubrication system for high speed rotating machinery of claim 11 wherein said means to partially evacuate the lower hollow shaft comprises centrifugal gas pumping means having an inlet in the upper shaft extension which extends down into the lower hollow shaft.

13. The lubrication system of claim 11 and in addition a rotary assembly inlet fluid buffered seal means disposed between the rotary assembly inlet and the lubricant sump, said seal means comprising a substantially frusto conical lubricant sump cap extending from the lubricant sump housing at its base to around the shaft assembly and a substantially frusto conical lubricant sump cap shroud positioned around and spaced from said lubricant pump cap to form a passageway therebetween, said lubricant sump cap having openings from the shaft assembly to the interior of the lubricant sump housing, said lubricant sump cap shroud having openings at its base to permit the entry of rotary assembly inlet fluid to the passageway between said lubricant sump cap shroud and said lubricant sump cap.

14. A lubrication system for high speed rotating machinery comprising:

a housing including a lubricant sump at the lower end thereof;

a vertically disposed shaft assembly including a lower hollow shaft rotatably mounted within said housing and extending into the lubricant sump and an upper shaft supporting rotating assembly;

bearing means positioned within said housing around said hollow shaft to rotatably support said shaft assembly, said bearing means including at least one bearing above the level of the lubricant sump at the lower end of said housing, said lower hollow shaft having openings therein associated with said bearing means;

the upper shaft of said vertically disposed shaft assembly including a lower portion extending down into the interior of the lower hollow shaft, said lower hollow shaft having an interior shoulder above the hollow shaft opening associated with the uppermost bearing above the level of the lubricant sump;

a spacer tube concentrically disposed in a spaced relationship between the lower portion of the upper shaft and the lower hollow shaft extending downward from the interior shoulder of the lower hollow shaft to near the bottom of the lower portion of the upper shaft;

means to place said spacer tube in compression between interior shoulder of the lower hollow shaft and the bottom of the lower portion of the upper shaft to tension the lower portion of said upper shaft; and centrifugal gas pumping means operably associated with said vertically disposed shaft assembly to partially evacuate the lower hollow shaft;

rotation of said vertically disposed shaft forming a vortex of lubricant within the partially evacuated lower hollow shaft to deliver lubricant to said bearing means through the openings in the lower hollow shaft.

15. The lubrication system for high speed rotating machinery of claim 14 wherein said centrifugal gas pumping means includes a centrifugal slinger disposed on the exterior of the lower hollow shaft above the uppermost bearing above the level of the lubricant sump, said lower hollow shaft having openings therein associated with said slinger to communicate said slinger with the interior of the lower hollow shaft and the space between the lower portion of said upper shaft and said concentrically disposed spacer tube, the lower portion of said upper shaft having passageways at the bottom thereof to communicate the rotational centerline of said shaft assembly with the space between the lower portion of said upper shaft and said concentrically disposed spacer tube and provide an inlet for said centrifugal slinger.

* * * * *